US012007087B2

(12) United States Patent
Tomasetig et al.

(10) Patent No.: US 12,007,087 B2
(45) Date of Patent: Jun. 11, 2024

(54) MOTOR VEHICLE HEADLAMP

(71) Applicant: ZKW Group GmbH, Wieselburg (AT)

(72) Inventors: Stefan Tomasetig, Purgstall an der Erlauf (AT); Christian Jackl, Wieselburg (AT); Bernd Eichinger, Krummnussbaum (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/018,670

(22) PCT Filed: Aug. 9, 2021

(86) PCT No.: PCT/EP2021/072145
§ 371 (c)(1),
(2) Date: Jan. 30, 2023

(87) PCT Pub. No.: WO2022/043039
PCT Pub. Date: Mar. 3, 2022

(65) Prior Publication Data

US 2023/0313959 A1 Oct. 5, 2023

(30) Foreign Application Priority Data

Aug. 28, 2020 (EP) .................................... 20193345

(51) Int. Cl.
*F21S 41/147* (2018.01)
*F21S 41/151* (2018.01)
(Continued)

(52) U.S. Cl.
CPC ........... *F21S 41/147* (2018.01); *F21S 41/151* (2018.01); *F21S 41/39* (2018.01); *F21S 45/47* (2018.01); *F21W 2102/13* (2018.01)

(58) Field of Classification Search
CPC ........ F21S 41/147; F21S 45/47; F21S 41/151; F21S 41/39; F21S 41/141; F21S 41/14;
(Continued)

(56) References Cited

U.S. PATENT DOCUMENTS 4,707,767 A * 11/1987 Bergin .................. F21S 41/321 362/310
9,458,976 B2 * 10/2016 Krenn ..................... F21S 45/49
(Continued)

FOREIGN PATENT DOCUMENTS

DE 102007040728 A1 * 3/2009 ............ F21S 41/141
DE 102015119524 A1 5/2017
(Continued)

OTHER PUBLICATIONS

International Search Report for PCT/EP2021/072145, dated Sep. 9, 2021 (14 pages).

(Continued)

*Primary Examiner* — Bao Q Truong
(74) *Attorney, Agent, or Firm* — Eversheds Sutherland (US) LLP

(57) ABSTRACT

The invention relates to a motor vehicle headlight (1) with adjustable dipped beam, comprising at least two dipped beam modules (2) for the shared radiation of a dipped beam distribution, wherein each dipped beam module (2) are respectively set up to radiate a portion of the dipped beam distribution with a predeterminable light intensity, at least one light source carrier (3) with light sources (4), wherein at least one light source (4) is associated with each dipped beam module (2), wherein each dipped beam module (2) comprises a reflector (**2*a*) with at least one focal point (P) or a focal line, and at least one light source (4) is arranged in the focal point (P) or a focal line of the reflector (2*a***), and
(Continued)

Figure 1:
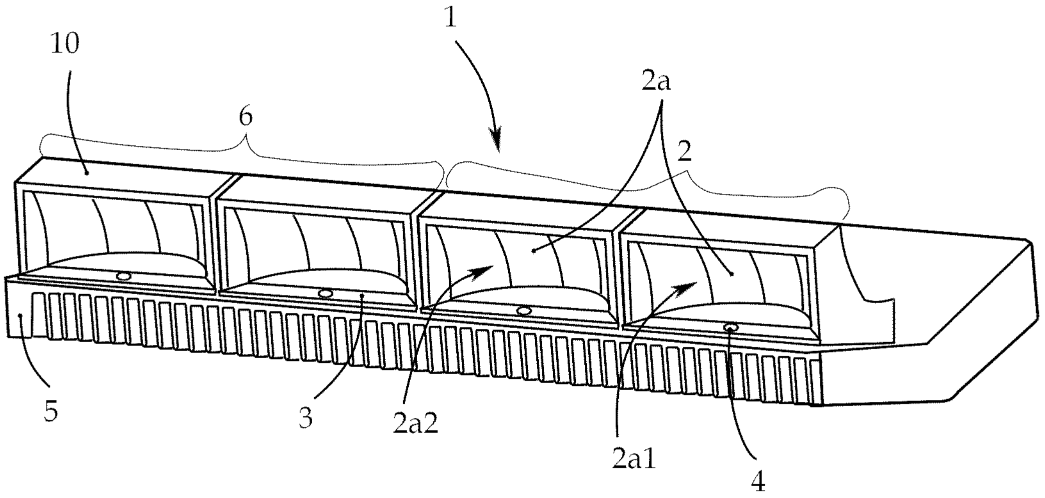

each dipped beam module reflector (2*a*) is configured so that the light distribution radiated from each dipped beam module (2) and also the light-dark boundary of the respective dipped beam distribution is finally established in connection with the mounting position of the dipped beam module reflector (2*a*), wherein the dipped beam module reflector (2*a*), for establishing the course of a light-dark boundary of the respective portion of the dipped beam distribution has at least one edge (K) displaying this boundary in the reflector surface, and at least one cooling body (5), on which the light source carrier (3) and the dipped beam modules (2) are fastened, wherein at least one of the dipped beam module reflectors (2*a*, 2*a*2) is able to be securely connected to the cooling body (5) in an adjustable manner via respectively a reflector holder (2*b*), wherein each reflector holder (2*b*) has at least one guide section (2*b*'), and each adjustable dipped beam module reflector (2*a*2) has a corresponding engagement section (2*a*') for engagement into the guide portion (2*b*'), wherein the guide section (2*b*') of the reflector holder (2*b*) is configured such that a dipped beam module reflector (2*a*2) which is in engagement with the reflector holder (2*b*) can be rotated continuously along a section of a circular path (B) and can be adjusted and fixed within a rotation range, established thereby, in any desired rotation position in relation to the reflector holder (2*b*), wherein the guide section (2*b*') is configured here in such a way that the centre point of the circular path coincides with the focal point (P) of the adjustable dipped beam module reflector (2*a*2) or lies on the focal line of the adjustable dipped beam module reflector (2*a*2).

14 Claims, 3 Drawing Sheets

(51) Int. Cl.
*F21S 41/39* (2018.01)
*F21S 45/47* (2018.01)
*F21W 102/13* (2018.01)

(58) Field of Classification Search
CPC ............ F21S 41/30; F21S 41/40; F21S 45/40; F21W 2102/13; F21V 7/00; F21V 7/04; F21V 29/502; F21V 29/503
See application file for complete search history.

(56) References Cited

U.S. PATENT DOCUMENTS

| | | | |
|---|---|---|---|
| 2009/0251916 | A1 | 10/2009 | Tanaka et al. |
| 2014/0334145 | A1 | 11/2014 | Turley, Jr. et al. |
| 2015/0204499 | A1 | 7/2015 | Pawliczek et al. |
| 2015/0204503 | A1 | 7/2015 | Krenn et al. |

FOREIGN PATENT DOCUMENTS

| | | | |
|---|---|---|---|
| DE | 102017124094 | A1 | 4/2019 |
| JP | 2009163921 | A | 7/2009 |
| JP | 2014154521 | A | 8/2014 |
| JP | 2016007911 | A | 1/2016 |

OTHER PUBLICATIONS

Search Report for European Patent Application No. 20193345.4, dated Nov. 26, 2020 (9 pages).

* cited by examiner

MOTOR VEHICLE HEADLAMP

The invention relates to a motor vehicle headlight with adjustable dipped beam, comprising

- at least two dipped beam modules for shared radiation of a dipped beam distribution, wherein each dipped beam module are respectively set up to radiate a portion of the dipped beam distribution with a predeterminable light intensity, so that by superimposing the dipped beam distribution portions a shared dipped beam distribution occurs,
- at least one light source carrier with a number of light sources, wherein at least one light source is associated with each dipped beam module, wherein each dipped beam module comprises a reflector with at least one focal point or a focal line, and at least one light source is arranged in the focal point or a focal line of the reflector, and each dipped beam module reflector is configured so that the light distribution radiated from each dipped beam module and also the light-dark boundary of the respective dipped beam distribution is finally established in connection with the mounting position of the dipped beam module reflector, wherein for establishing the course of a light-dark boundary of the respective portion of the dipped beam distribution, the dipped beam module reflector has at least one edge in the reflector surface displaying this boundary, and
- at least one cooling body, on which the light source carrier and the dipped beam modules are attached.

Such motor vehicle headlights have become known from the prior art. In the production and mounting of these motor vehicle headlights, care is to be taken that the individual dipped beam modules, which can basically have the same radiation characteristic, are mounted correctly with respect to one another, so that the light-dark boundaries of the respective modules, which become visible in the form of the respectively projected light distribution, coincide with one another.

As the position of the light-dark boundary is critical and typically has to meet legal requirements, in many motor vehicle headlight systems hitherto dipped beam modules were used which consist of a single displaying system, so that it is not necessary to superimpose light distributions of the same kind with one another and to align these exactly with respect to one another. However, in so far as several dipped beam modules of the same kind were used, these had to be produced and mounted in a particularly exact manner in order to ensure a precise coinciding of the respective light-dark boundary. Thereby, in these cases, both the production methods and also the materials which were used had to meet particularly high requirements, which have made the production of motor vehicle headlights comprising at least dipped beam modules difficult or respectively have given rise to considerable costs there.

An object of the invention therefore consists in creating a motor vehicle headlight of the type named in the introduction, which is able to be produced more economically. This problem is solved by a motor vehicle headlight of the type named in the introduction, in which according to the invention at least one of the dipped beam module reflectors is able to be securely connected to the cooling body in an adjustable manner via respectively a reflector holder, wherein each reflector holder has at least one guide section, and each adjustable dipped beam module reflector has a corresponding engagement section for engagement into the guide section, wherein the guide section of the reflector holder is configured in such a way that a dipped beam module reflector which is in engagement with the reflector holder can be rotated continuously along a section of a circular path and can be adjusted and fixed with respect to the reflector holder in any desired rotation position, wherein the guide section is configured in such a way that the centre point of the circular path coincides with the focal point of the adjustable dipped beam module reflector or lies on the focal line of the adjustable dipped beam module reflector. Thereby, it is possible to bring the light distribution of the dipped beam module reflectors or respectively of the dipped beam modules comprising these according to their production in a simple manner into exact coincidence, so that both in production and also on mounting, greater manufacturing tolerances can be accepted, which enable a more favourable production. On finalizing of the headlight, the modules can be aligned to one another, so that on the one hand the headlight is finally checked and, at the same time, optimized, with regard to its light distribution. In other words, by rotation of the reflector about the focal point, it is possible to place the mechanical connection of the reflector very close to the light source (e.g. LED). This has the advantage of a short tolerance chain of the light source to the reflector, whereby also costs can be saved. A defocussing can be prevented through this adjustment concept, which is particularly advantageous in the case of reflectors which are small in size, because a defocussing would greatly distort the light pattern and then, in certain circumstances, one has problems fulfilling legal requirements. Reflectors which are small in size are very tolerance-sensitive to changes in position with respect to the LED, for which reason conventional adjustment kinematics which e.g. provide a partial deforming of the reflector (e.g. targeted "squashing" of reflectors), are not expedient. The adjustment kinematics described in the invention offer the particular advantage that on a rotation about the focal point, the light distribution in itself remains unchanged.

The number of light sources can basically be freely selected and is not limited to a specific number. Thus, precisely one light source or also two or more light sources could be provided per dipped beam module. The rotation of the adjustable dipped beam module reflector takes place about a horizontal axis, so that the height of the light-dark boundary can be adjusted. The expression "horizontal" refers here to the final installation position in a motor vehicle, which is situated on a horizontal plane—therefore is also horizontally oriented. The expression according to which "the light distribution radiated from each dipped beam module and also the light-dark boundary of the respective dipped beam distribution, is finally established in connection with the installation position of the dipped beam module reflector" is understood to mean that no projection lenses or other light-forming components are arranged downstream of the respective dipped beam module reflector, but rather the latter constitutes the last member in the light-forming optical chain of the dipped beam module, and the dipped beam module reflector thus—depending on its position and orientation—establishes the final position of the light-dark boundary in its projection, wherein of course the projections of individual dipped beam modules, as already previously described, are superimposed to one another.

In order to achieve a compact and stable structure, provision can be made that the light source carrier is arranged between the cooling body and the dipped beam module reflectors.

Furthermore, provision can be made that the guide section of each reflector holder has a surface which is dish-shaped or shaped in the form of a cylinder jacket segment, and the engagement section of each adjustable dipped beam module reflector is formed in a corresponding manner thereto, so that a form-fitting sliding of the engagement section along the guide section is enabled. In this way, a robust adjustment mechanism is created.

In particular, provision can be made that in the engagement section of each adjustable dipped beam module reflector a threaded hole is formed to receive the thread of a screw, and in the guide section of each reflector holder a corresponding elongated hole is arranged to receive a fastening screw, wherein the elongated hole is configured in such a way that a fastening screw is able to be inserted through the elongated hole into the threaded hole of the adjustable dipped beam module reflector at any desired position of the adjustable dipped beam module reflector along the entire rotation range, and thus enables a fixing of the adjustable dipped beam module reflector in relation to the respective reflector holder. Thereby, a continuous adjusting and a fixing is possible in any desired adjustment position.

Furthermore, provision can be made that in the guide section and in the engagement section a bore is formed, which is arranged for the form-fitting receiving of a fixing pin, which in the received state connects the guide section and the engagement section to one another and thus establishes a reference position within the rotation range. Thereby, e.g. a reference position can be predetermined, which can be referred to as starting position. This reference position can be selected here so that it corresponds to the expected optimum adjustment position and thus offers the best starting point for checking. In some cases, a further adjustment can thus be dispensed with—namely when the expected optimum adjustment position corresponds to the checked established optimum adjustment position. In the case of a deviation from the established optimum adjustment position, an optimum readjustment can be quickly carried out.

In particular, provision can be made that the motor vehicle headlight has precisely two dipped beam modules, and the dipped beam module reflector of one of the two dipped beam modules is fixed in a non-adjustable manner, and the dipped beam module reflector of the remaining dipped beam module is fixed on the cooling body in an adjustable manner via a reflector holder.

Furthermore, provision can be made that the motor vehicle headlight has three or more dipped beam modules, and at least all the dipped beam module reflectors, with the exception of a single dipped beam module reflector serving as reference, are fixed on the cooling body in an adjustable manner via respectively a reflector holder. A dipped beam module reflector can thus be formed structurally in a particularly simple manner, by the latter being able to be mounted permanently without an adjustment mechanism being necessary for this. The remaining reflectors can still be adjusted, so that in total an exact superimposing of the light-dark boundaries is possible.

In particular, provision can be made that the light source is an LED light source.

In particular, provision can be made that the light source is arranged in the focal point or in the focal line of the respective dipped beam module reflector. Thus in the case of a rotation of the dipped beam module reflector, the light distribution is only changed in its position without manipulating the light pattern itself (therefore the composition of the light distribution as normal projection independently of its position).

In particular, provision can be made that the arrangement of the light source takes place here so that the centre point of the circular path of the rotation range of the adjustable dipped beam module reflector coincides with the focus of the light emission area of the light source. As the light sources typically have a planar radiation behaviour up to a certain degree, changes to the light pattern in the case of a rotation of the dipped beam module reflector can be minimized.

Furthermore, provision can be made that the arrangement of the light source takes place here so that the centre point of the circular path of the rotation range of the adjustable dipped beam module reflector coincides with an edge delimiting the light emission area of the light source. The emitting light area of the LED is generally a rectangle or a square. The focal point of the LED sits in the geometric mean of the emitter area. Generally, the reflector is rotated about the centre of the focal point, because here also there is the most light. In the case of a dipped beam design, however, the reflector can be rotated about the outer edge (the emitter area) for a better delimiting light/dark line (on the road).

In particular, provision can be made that one of the at least two dipped beam module reflectors is securely connected to the cooling body in a non-adjustable manner. Non-adjustable means that no reflector holder with guide arrangements is necessary or respectively provided, but rather the dipped beam module reflector can be screwed non-movably directly to the cooling body.

Furthermore, provision can be made that the light-forming reflection areas of the dipped beam module reflectors are formed in a similar manner. This means that the reflectors are identical on the inner side—therefore in the optically active region facing the light source. The individual portions on the dipped beam distribution can thus be configured to be entirely homogeneous. Preferably, the light sources associated with the reflectors can also be identical. It is also possible that the dipped beam modules are developed fully homogeneously in their entirety.

In particular, provision can be made that the motor vehicle headlight additionally has dipped beam modules for generating a dipped beam distribution.

Furthermore, provision can be made that the dipped beam modules are securely connected to the cooling body.

The invention is explained more closely in the following with the aid of an exemplary and non-restrictive embodiment, which is illustrated in the figures. There are shown therein FIG. 1 a schematic illustration of a motor vehicle headlight in accordance with the invention, FIG. 2 a detail illustration of the rear side of dipped beam modules of the headlight according to FIG. 1, FIG. 3 a sectional illustration of an adjustable dipped beam module reflector of the headlight in accordance with the invention according to FIGS. 1 to 2 in a first position L1, FIG. 4 a sectional illustration of the adjustable dipped beam module reflector according to FIG. 3 in a second position L2, and FIG. 5 a view of the rear side of the adjustable dipped beam module reflector according to FIGS. 3 and 4.

In the following figures—in so far as not indicated otherwise—the same reference numbers designate identical features.

FIG. 1 shows a schematic illustration of a motor vehicle headlight 1 according to the invention, with an adjustable dipped beam. This motor vehicle headlight 1 comprises at least two dipped beam modules 2 for the shared radiation of a dipped beam distribution, wherein each dipped beam module 2 are respectively set up to radiate a portion of the dipped beam distribution with a predeterminable light intensity, so that by superimposing the dipped beam distribution portions a shared dipped beam distribution occurs.

The headlight 1 furthermore comprises at least one light source carrier 3 with a number of light sources 4, wherein at least one light source 4 is associated with each dipped beam module 2. Each dipped beam module 2 comprises a reflector 2*a* with at least one focal point P (see FIG. 3) or a focal line. The at least one light source 4 is arranged respectively in the focal point P or the focal line of the reflector 2*a*.

Each dipped beam module reflector 2*a* is configured so that the light distribution which is radiated from each dipped beam module 2, and also the light-dark boundary of the respective dipped beam distribution is finally established in connection with the mounting position of the dipped beam module reflector 2*a*, wherein the dipped beam module reflector 2*a*, for establishing the course of a light-dark boundary of the respective portion of the dipped beam distribution, has at least one edge K displaying this boundary (see FIG. 3) in the reflector surface. The headlight 1 comprises in addition at least one cooling body 5, on which the light source carrier 3 and the dipped beam modules 2 are fastened. The light source carrier 3 is arranged between the cooling body 5 and the dipped beam module reflectors 2*a* or respectively 2*a*1 and 2*a*2. The motor vehicle headlight 1 additionally comprises dipped beam modules 6 for generating a dipped beam distribution. These dipped beam modules 6 are securely connected to the cooling body 5. The light modules 2 and 6 are clad in a housing 10, which e.g. can also be formed in one piece with the cooling body 5.

Figure 2:
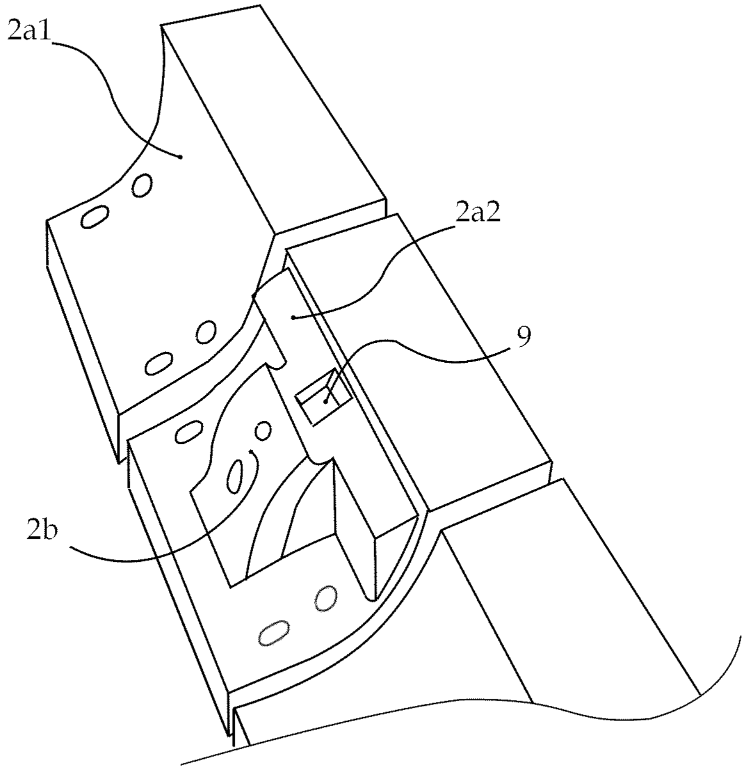
Figure 3:
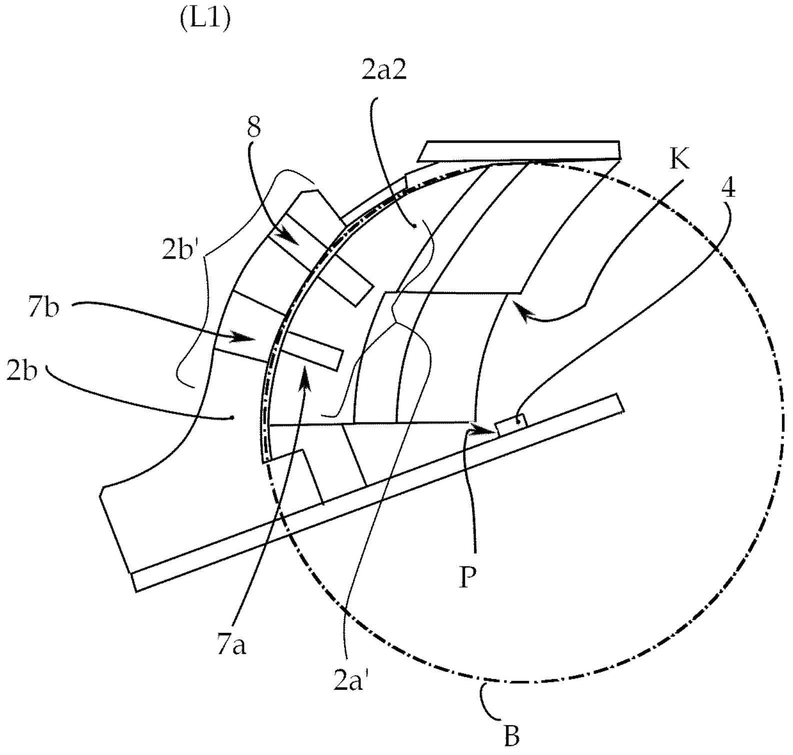

Viewing FIGS. 2 and 3, it can be seen that in the present embodiment which is shown, two dipped beam module reflectors 2*a* are provided, wherein one of the dipped beam module reflectors 2*a* is permanently mounted, namely the dipped beam module reflector which is referenced by the reference number 2*a*1 (see FIGS. 2 and 3). On the other hand, the dipped beam module reflector 2*a*2 is adjustable, by the latter being displaceable and securely connectable to the cooling body 5 via a reflector holder 2*b*. For this, the reflector holder 2*b* has at least one guide section 2*b*' (see FIGS. 3 and 4), and the adjustable dipped beam module reflector 2*a*2 has an engagement section 2*a*', corresponding hereto, for engagement into the guide section 2*b*'. Here, the guide section 2*b*' of the reflector holder 2*b* is configured in such a way that the dipped beam module reflector 2*a*2 which is in engagement with the reflector holder 2*b* can be rotated continuously along a section of circular path B and can be adjusted and fixed within a thereby established rotation range in any desired rotation position in relation to the reflector holder 2*b*.

In FIG. 2 in the guide section 2*a*' a guide groove 9 can be seen, into which a projection, not shown in the figures, of the reflector holder 2*b* engages. The guide groove 9 extends like a segment in the shape of a circular path around the centre point of the circular path B, so that the adjustable dipped beam module reflector 2*a*2 can be rotated along the groove 9 about the centre point of the circular path B.

FIG. 3 shows the dipped beam module reflector 2*a*2 in a first position L1. The guide section 2*b*' is configured in such a way that the centre point of the circular path B coincides with the focal point P of the adjustable dipped beam module reflector 2*a*2. Alternatively to the focal point, a focal line could also be provided.

The guide section 2*b*' of each reflector holder 2*b* has a surface which is dish-shaped or shaped in the form of a cylinder jacket segment, wherein the engagement section 2*a*' of each adjustable dipped beam module reflector 2*a*2 is formed corresponding thereto, so that a form-fitting sliding of the engagement section 2*a*' along the guide section 2*b*' is enabled. In the engagement section 2*a*' of each adjustable dipped beam module reflector 2*a*2, a threaded hole 7*a* is formed for receiving the thread of a screw (not shown in the figures), and in the guide section 2*b*' of each reflector holder 2*b* a corresponding elongated hole 7*b* is arranged for receiving a fastening screw. The elongated hole 7*b* is formed in such a way that a fastening screw is able to be inserted through the elongated hole 7*b* into the threaded hole 7*a* of the adjustable dipped beam module reflector 2*a* at any desired position of the adjustable dipped beam module reflector 2*a*2 along the entire rotation range, and thus enables a fixing of the adjustable dipped beam module reflector 2*a* in relation to the respective reflector holder 2*b*.

In the guide section 2*b*' and in the engagement section 2*a*', a bore 8 is formed, which is set up for the form-fitting receiving of a fixing pin (not shown in the figures). By inserting a fixing pin into the bore 8, the guide section 2*b*' can be connected to the engagement section 2*a*', so that the position of the dipped beam module reflector 2*a*2—here in a reference position L1—is fixed. This position lies within an adjustable rotation range and can conveniently constitute the centre position of the rotation range. Generally, the light-forming reflection areas of the dipped beam module reflectors 2*a* or respectively 2*a*1 and 2*a*2 can be formed homogeneously.

The light source 4 can be e.g. an LED light source. It can be arranged in the focal point P or in the focal line of the respective dipped beam module reflector 2*a*, 2*a*1 or respectively 2*a*2. Here, provision can be made that the arrangement of the light source takes place here so that the centre point of the circular path B of the rotation range of the adjustable dipped beam module reflector 2*a*2 coincides with the focus of the light emission area of the light source 4. Alternatively thereto, provision can be made that the arrangement of the light source 4 takes place here so that the centre point of the circular path B of the rotation range of the adjustable dipped beam module reflector 2*a*2 coincides with an edge delimiting the light emission area of the light source 4.

Figure 4:
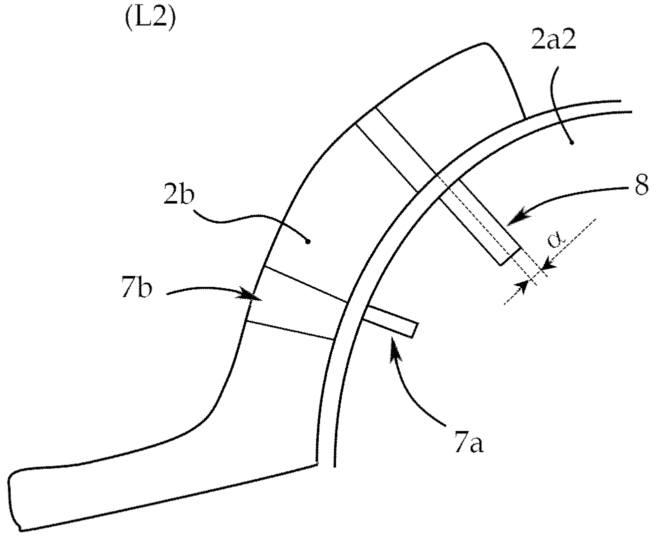

FIG. 4 shows a schematic sectional illustration of the adjustable dipped beam module reflector 2*a*2 according to FIG. 3 in a second position L2. Here, the adjustable dipped beam module reflector 2*a*2 was rotated clockwise about the angle α. The rotation axis is oriented horizontally here in the installed state. The light-dark boundary was therefore lowered in this example in the second position L2 by the angle α. Of course, a rotation in the opposite direction is also conceivable. The elongated hole 7*b* is formed here so that a sufficient adjustability is possible in both rotation directions and thus a sufficient rotation range is created.

Figure 5:
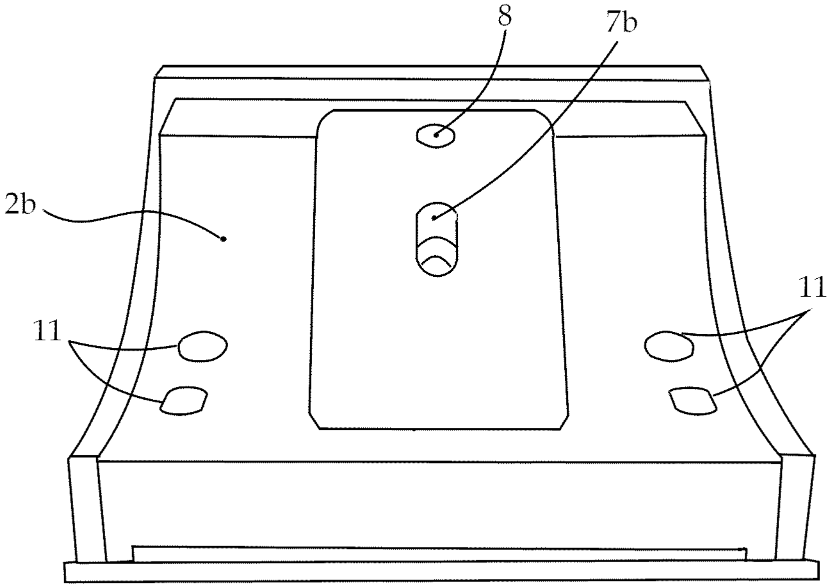

FIG. 5 shows a view of the rear side of the adjustable dipped beam module reflector 2*a*2 according to FIGS. 3 and 4. Therein, the reflector holder 2*b* can be seen, which can be securely connected to the light source carrier 3 and to the cooling body 5 via screw openings 11.

As already mentioned, in the embodiment which is shown, provision is made that the motor vehicle headlight 1 has precisely two dipped beam modules 2, and the dipped beam module reflector 2*a*1 of one of the two dipped beam modules 2 is fixed non-adjustably, and the dipped beam module reflector 2*a*2 of the remaining dipped beam module 2 is fixed to the cooling body 5 adjustably via a reflector holder 2*b*. Of course, the number of adjustable dipped beam module reflectors 2*a*2 can also deviate from the embodiment which is shown. Also, all the dipped beam module reflectors 2*a* could be adjustable, and at least one dipped beam module reflector thereof could be fixed in the reference position L1 by means of a fixing pin. In this case, all the dipped beam modules could be formed homogeneously.

The invention is not limited to the embodiments which are shown, but rather is defined by the entire scope of protection of the claims. Individual aspects of the invention or respectively of the embodiments can also be taken up and combined with one another. Any reference numbers in the claims are by way of example and serve only for easier readability of the claims, without limiting these.

The invention claimed is:

1. A motor vehicle headlight (1) with adjustable dipped beam, comprising:

at least two dipped beam modules (2) for the shared radiation of a dipped beam distribution, wherein each dipped beam module (2) is respectively set up to radiate a portion of the dipped beam distribution with a predeterminable light intensity, so that by superimposing of the dipped beam distribution portions a shared dipped beam distribution occurs, at least one light source carrier (3) with a number of light sources (4), wherein at least one light source (4) is associated with each dipped beam module (2), wherein each dipped beam module (2) comprises a reflector (2*a*) with at least one focal point (P) or a focal line, and at least one light source (4) is arranged in the focal point (P) or a focal line of the reflector (2*a*), and each dipped beam module reflector (2*a*) is configured so that the light distribution radiated from each dipped beam module (2) and also the light-dark boundary of the respective dipped beam distribution is finally established in connection with the mounting position of the dipped beam module reflector (2*a*), wherein the dipped beam module reflector (2*a*), for establishing the course of a light-dark boundary of the respective portion of the dipped beam distribution has at least one edge (K) displaying this boundary in the reflector surface, and at least one cooling body (5), on which the light source carrier (3) and the dipped beam modules (2) are fastened, wherein at least one of the dipped beam module reflectors (2, 2*a*2) is able to be securely connected to the cooling body (5) in an adjustable manner via respectively a reflector holder (2*b*), wherein each reflector holder (2*b*) has at least one guide section (2*b*'), and each adjustable dipped beam module reflector (2*a*2) has a corresponding engagement section (2*a*') for engagement into the guide portion (2*b*'), wherein the guide section (2*b*') of the reflector holder (2*b*) is configured in such a way that a dipped beam module reflector (2*a*2) which is in engagement with the reflector holder (2*b*) can be rotated continuously along a section of a circular path (B) and can be adjusted and fixed within a rotation range, established thereby, in any desired rotation position in relation to the reflector holder (2*b*), wherein the guide section (2*b*') is configured here in such a way that the centre point of the circular path (B) coincides with the focal point (P) of the adjustable dipped beam module reflector (2*a*2) or lies on the focal line of the adjustable dipped beam module reflector (2*a*2), and wherein the guide section (2*b*') of each reflector holder (2*b*) has a surface which is dish-shaped or shaped in the form of a cylinder jacket segment, and the engagement section (2*a*') of each adjustable dipped beam module reflector (2*a*2) is formed corresponding thereto, so that a form-fitting sliding of the engagement section (2*a*') along the guide section (2*b*') is enabled.

2. The motor vehicle headlight (1) according to claim 1, wherein the light source carrier (3) is arranged between the cooling body (5) and the dipped beam module reflectors (2*a*, 2*a*1, 2*a*2).

3. The motor vehicle headlight (1) according to claim 1, wherein in the engagement section (2*a*') of each adjustable dipped beam module reflector (2*a*2) a threaded hole (7*a*) is formed for receiving the thread of a screw, and in the guide section (2*b*') of each reflector holder (2*b*) a corresponding elongated hole (7*b*) is arranged for receiving a fastening screw, wherein the elongated hole (7*b*) is formed in such a way that a fastening screw is able to be inserted through the elongated hole (7*b*) into the threaded hole (7*a*) of the adjustable dipped beam module reflector (2*a*) at any desired position of the adjustable dipped beam module reflector (2*a*2) along the entire rotation range, and thus enables a fixing of the adjustable dipped beam module reflector (2*a*) in relation to the respective reflector holder (2*b*).

4. The motor vehicle headlight (1) according to claim 3, wherein in the guide section (2*b*') and in the engagement section (2*a*') a bore is formed, which is arranged for the form-fitting receiving of a fixing pin which, in the received state, connects the guide section (2*b*') and the engagement section (2*a*') to one another and thus establishes a reference position (L1) within the rotation range.

5. The motor vehicle headlight (1) according to claim 4, wherein the motor vehicle headlight (1) has precisely two dipped beam modules (2), and the dipped beam module reflector (2*a*1) of one of the two dipped beam modules (2) is fixed non-adjustably, and the dipped beam module reflector (2*a*2) of the remaining dipped beam module (2) is fixed to the cooling body (5) adjustably via a reflector holder (2*b*).

6. The motor vehicle headlight (1) according to claim 1, wherein the motor vehicle headlight (1) has three or more dipped beam modules (2), and at least all the dipped beam module reflectors (2*a*2) with the exception of a single dipped beam module reflector (2*a*1), serving as reference, are fixed to the cooling body (5) adjustably via respectively a reflector holder (2*b*).

7. The motor vehicle headlight (1) according to claim 1, wherein the light source (4) is an LED light source.

8. The motor vehicle headlight (1) according to claim 1, wherein the light source is arranged in the focal point (P) or in the focal line of the respective dipped beam module reflector (2*a*, 2*a*1, 2*a*2).

9. The motor vehicle headlight (1) according to claim 8, wherein the arrangement of the light source is configured so that the centre point of the circular path (B) of the rotation range of the adjustable dipped beam module reflector (2*a*2) coincides with the focus of the light emission area of the light source (4).

10. The motor vehicle headlight (1) according to claim 8, wherein the arrangement of the light source (4) is configured so that the centre point of the circular path (B) of the rotation range of the adjustable dipped beam module reflector (2*a*2) coincides with an edge delimiting the light emission area of the light source.

11. The motor vehicle headlight (1) according to claim 1, wherein one of the at least two dipped beam module reflectors (2*a*) is securely connected non-adjustably to the cooling body (5).

12. The motor vehicle headlight (1) according to claim 1, wherein the light-forming reflection areas of the dipped beam module reflectors (2*a*, 2*a*1, 2*a*2) are formed homogeneously.

13. The motor vehicle headlight (1) according to claim 1, wherein the motor vehicle headlight (1) additionally has dipped beam modules (6) for generating a dipped beam distribution.

14. The motor vehicle headlight (1) according to claim 13, wherein the dipped beam modules (6) are securely connected to the cooling body (5).

* * * * *